United States Patent [19]
Thompson

[11] 3,795,947
[45] Mar. 12, 1974

[54] CLAMPING DEVICE FOR ADJUSTABLE LENGTH MEANS

[76] Inventor: Peter James Thompson, 256 Beverley Rd., Anlaby Hull Yorkshire, England

[22] Filed: Jan. 26, 1973

[21] Appl. No.: 326,809

[52] U.S. Cl. .............. 24/73 R, 24/196, 248/361 A
[51] Int. Cl. .................... A44b 21/00, A44b 11/10
[58] Field of Search .... 248/361 A; 24/73 R, 73 PH, 24/265 CD, 68 CD, 68 SB, 68 E, 71.3, 71 SB, 71 TD, 71 ST, 171, 194, 195, 196

[56] References Cited
UNITED STATES PATENTS

| | | | |
|---|---|---|---|
| 688,503 | 12/1901 | Cross | 24/194 UX |
| 2,372,967 | 4/1945 | Martin | 248/361 A |
| 2,679,670 | 6/1954 | Griswold | 248/361 A X |
| 2,717,595 | 9/1955 | Millman | 24/194 X |
| 3,169,291 | 2/1965 | Stacherl | 24/196 |
| 3,449,798 | 6/1969 | Hofmann | 24/71 ST |
| 3,512,830 | 5/1970 | Norman et al. | 24/73 PH |

FOREIGN PATENTS OR APPLICATIONS 1,138,737     1969     Great Britain .................... 24/71 ST

*Primary Examiner*—Donald A. Griffin
*Attorney, Agent, or Firm*—William A. Drucker

[57] ABSTRACT

A clamp, for holding flexible means in adjusted effective length extending between spaced apart attachment elements, having a gripping element with flexible limbs on opposite sides of a clamping bar with apertures in said limbs passed through by one of said flexible means in arrangement such that strain on said flexible means on adjustment of the effective length thereof causes said gripping element to press part of said one flexible means onto said clamping bar and cause said part to assume a tortuous shape whereby the greater the strain on said flexible means the greater will be the clamping action to avoid possible slip of said flexible means even should it be slippery due to wetness or other cause.

3 Claims, 4 Drawing Figures

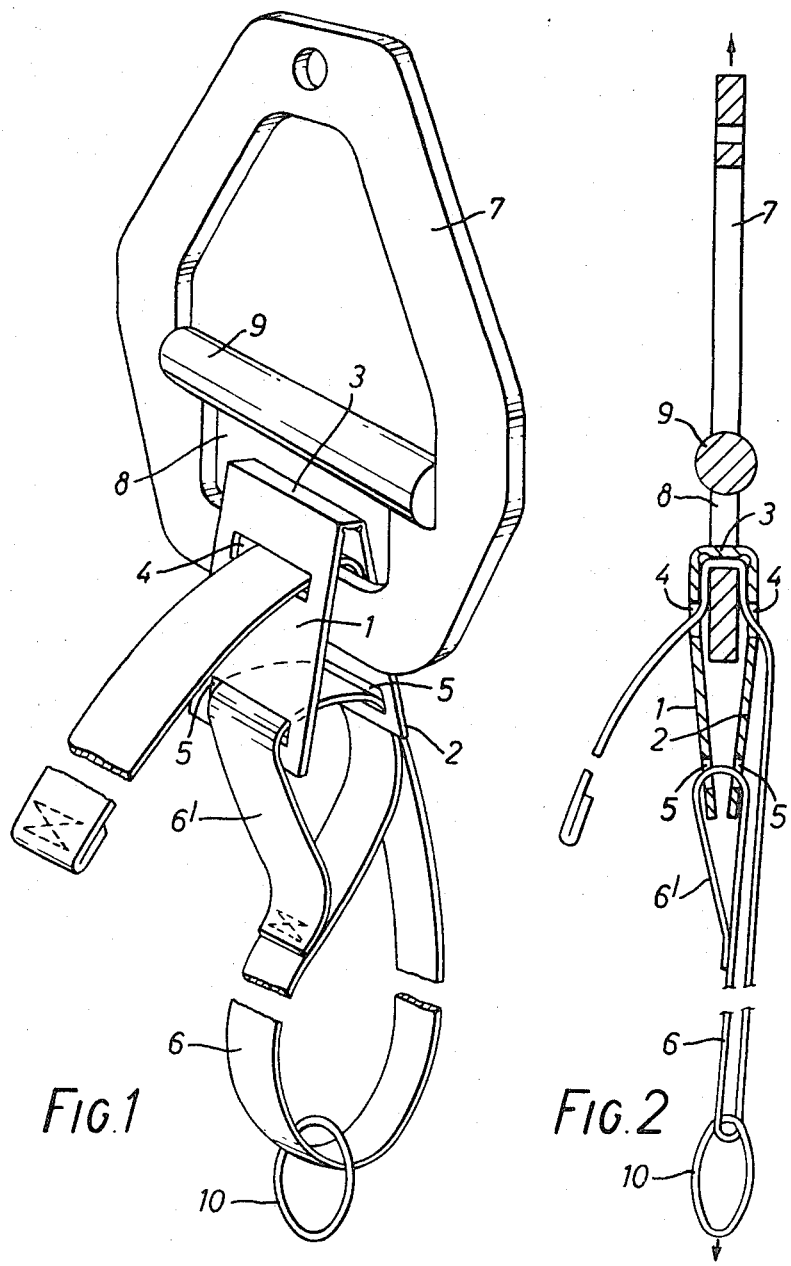

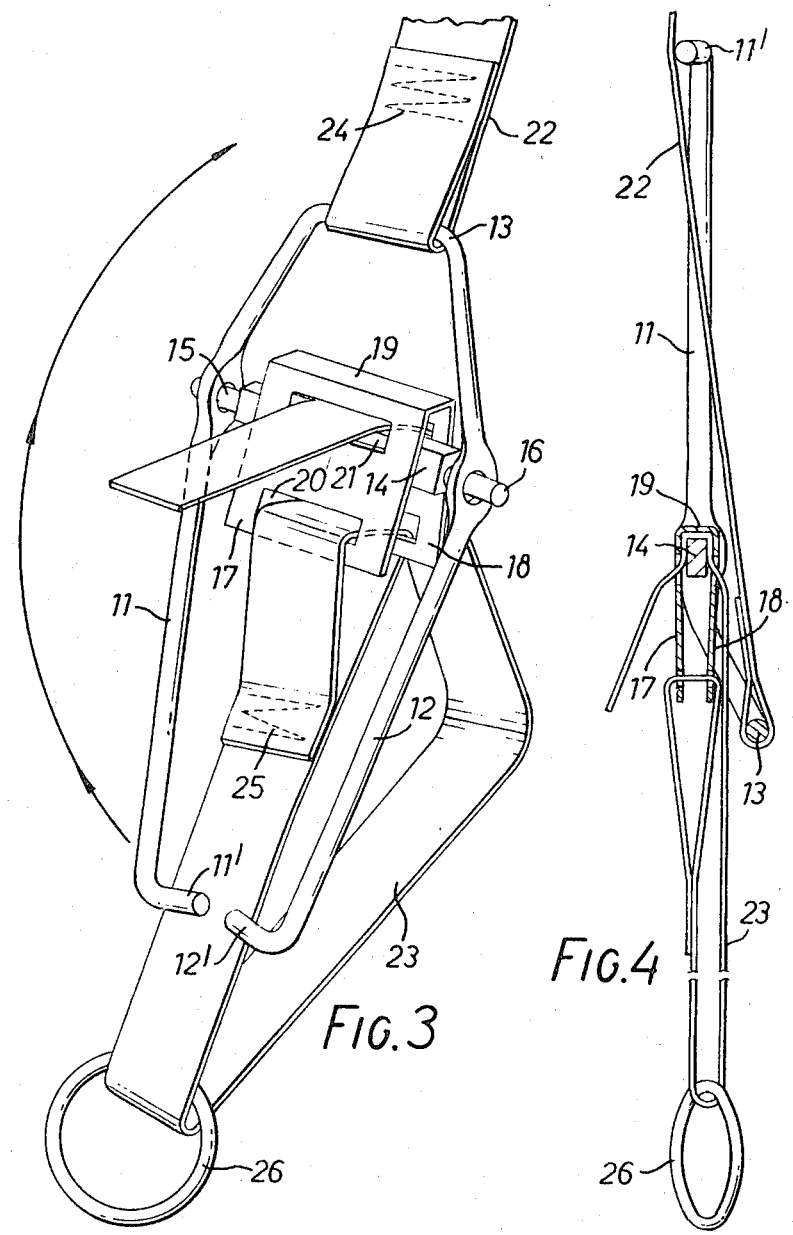

CLAMPING DEVICE FOR ADJUSTABLE LENGTH MEANS

This invention relates to clamping devices for holding adjustable length means extending between attachment elements in adjusted effective length against strain tending to increase such length thereof, and to lashings and like tie-downs incorporating the same.

The object of the invention is to provide a clamping device such that adjustable length means may be quickly and easily adjusted to shorten or increase the effective length thereof with positive grip of the clamping device during the application of strain on the adjustable length means.

A further object of the invention is to provide such clamping device with a mechanical action to provide increases in tension on the adjustable length means and for locking the clamping device in operative condition.

According to the present invention, a clamp for use with a length of flexible adjustable length material comprises a gripping element of substantially U-shape section capable of movement relative to a clamping bar located between its limbs in each of which is a pair of slots, such that with the outermost of such slots passed through by a loop formed at the end of the length of flexible material which after passing through an attachment then extends through the innermost slots between the base portion of the gripping element and the clamping bar, whereby pull on the other end of the length of flexible material in drawing more thereof through the slots to vary its effective length imposes a strain thereon which causes the gripping element to cooperate with the clamping bar to hold the material from being pulled through the innermost slots in either direction.

The clamping bar may form a portion of or be carried by a main member connected to a wire or second length of flexible material, which is attached to a second attachment element; and the gripping element has limbs capable of flexing or rocking relative to its base portion, in all cases such that strain imposed on the first length of flexible material causes the loop at its end to move the free ends of the limbs towards one another as well as bodily displace the gripping element towards the clamping bar so that the flexible material is held in a tortuous path between the edges of the slots through which it passes and the clamping bar and such limbs, and even possibly the base portion also press the material against the clamping bar. In this way a positive double locking action prevents any movement of the flexible material through the clamping device to increase its adjusted effective length since the greater the strain the greater will be the holding action sufficient to hold it even when it is slippery due to wetness or other cause, yet on deliberate relieving of the strain and with movement of the gripping element away from the clamping bar, the flexible material may freely pass through the slots in the limbs of the gripping element through which it extends.

In one embodiment of the present invention, the clamping bar is formed by an edge of a slot in a member in which is incorporated a finger grip portion and the gripping element is located with its base in such slot with its limbs on each side of such member for the outermost slots therein to be positioned beyond the marginal edge of such member. When there is no strain on the adjustable length flexible material the clamping element may move until the apertures in its limbs nearer to its base move clear of the clamping bar so that the free end portion of the flexible material may easily move through such apertures to increase or decrease the effective length thereof.

In another embodiment of the invention, the clamping bar is at its ends journalled in the limbs of a substantially U-shape member adjacent to the base portion thereof and the free ends of such limbs are oppositely inturned to spaced apart relation. With the gripping element connected to the adjustable length and the second length of flexible material connected to the base of such U-shape member and to an attachment element, the clamping device may further tension the lengths of flexible material and be locked in operative position by rotating the U-shaped member through some 180° relative to the clamping bar and then holding it by engaging the first length of flexible material by the inturned ends of its limbs.

The gripping element is made of metal or of plastics material such as polypropylene so that its limbs may flex or rock with respect to its base portion. The clamping bar may be metallic or made of the same material of the part of which it forms a portion.

The clamping device is capable of many applications as a lashing or tie-down and such like, e.g. for use with a water-ski tow or a steeple-jacks life line; but is particularly useful as part of trapezes in sailing boats when the clamping bar is incorporated in a part formed or provided with a hand grip such that the user may grasp the same and by pulling on such part relieve the strain on the flexible material while he effects adjustment in the effective length thereof. For use with a trapeze for a sailing boat, the part incorporating the clamping bar may comprise an ellipse with one axis substantially greater than the other with a straight bar portion extending between portions of said part at closer spacing and nearer to its one rounded end that the other, forming the finger grip portion. The adjustable length material is conveniently a flat web or band which may be woven of a material such as nylon or other man-made or natural fibre.

BRIEF DESCRIPTION OF DRAWINGS

FIG. 1 is a perspective view of one embodiment showing the parts when relieved of strain, FIG. 2 is a longitudinal section through the embodiment of FIG. 1 showing the parts when under strain, FIG. 3 is a perspective view of another embodiment with its constituent parts in normal or inoperative position, and FIG. 4 is a longitudinal section of the embodiment of FIG. 3 showing the slamping device with its parts in effective and locked position.

DESCRIPTION OF PREFERRED EMBODIMENTS OF THE INVENTION

The clamping element in the form illustrated in FIGS. 1 and 2 is made of plastics material such as polypropylene and comprises a substantially U-shape in section member having limbs 1 and 2 which can flex with respect to its base portion 3. The material may be of reduced thickness at the junctions of the base and limb portions. Each limb 1,2 is formed with two spaced apart parallel transverse slots 4,5.

The adjustable length means comprises an elongated flat woven web 6 of flexible material such as nylon.

A main member of moulding 7, of substantially elliptical shape in plastics material, has an aperture in which the clamping element is located for its limbs 1,2 to extend on opposite sides of the end portion thereof bounding such aperture. An edge of this aperture 8 forms a clamping bar with which the gripping element co-operates. The moulding 7 also has an aperture to recieve an end of a strain wire or like member such as the suspension wire of a sailing boat trapeze. A hand grip 9 is provided to extend across an enlargement of the aperture between more closely spaced portions of the moulding.

After positioning the clamping element substantially as shown with its limbs 1,2 on opposite of the moulding 7 for the ends thereof to extend beyond the end marginal edge of the moulding, one end of the web 6 is passed through the outermost apertures 5 in its limbs 1 and 2 and then attached to the web so forming an end loop 6'. The other end of the web 6 is passed through an attachment element, which may comprise a simple ring 10, and then through the innermost apertures 4 in the limbs 1,2 of the clamping element and the aperture 8 to extend between the base portion 3 and the edge of such aperture which forms the clamping bar.

When the adjustable length web 6 is free of strain, as illustrated in FIG. 1, the clamping element may move inwardly of the moulding 7 at which time the web 6 may move freely through the apertures 4 while aligned with the aperture 8 either to increase or reduce the effective length thereof between the attachment elements. On again applying strain, the end loop of the web 6 pulls on the limbs of the clamping element so pressing the base 3 of that device onto the portion of the web 6 between it and the edge of the aperture 8. At the same time contraction of the loop 6' urges the free ends of the limbs 1,2 of the clamping element towards one another, as illustrated in FIG. 2, so that portions of such limbs near the base 3 thereof also clamp the portions of the web 6 between them and part of the moulding 7 therebetween. Such clamping effectively prevents displacement of the web, the strain on which tends to increase the effective length thereof, and augments deterent to displacement thereof due to the tortuous shape of the portion of the web due to the displacement of the apertures 4 relative to the edge of the aperture 8 in the mounding 7 (see FIG. 2).

The clamping device illustrated in FIGS. 3 and 4, comprises a main member of substantially U-shape formed by limbs 11,12 with a base portion 13 and a rectangular section bar 14 with stub axle portions 15,16 at its ends which engage in apertures in the limbs 11,12 adjacent its base 13. The free ends $11^1$ and $12^1$ of the limbs 11,12 are oppositely in-turned and terminate spaced apart from one another. The clamping device is completed by a gripping element, of substantially U-shape in section, comprising flat limbs 17,18 and a flat base 19 relative to which the limbs 17,18 may flex. Each of the limbs 17,18 has two parallel slots 20,21.

The clamping device is used with two flexible bands 22,23 of which the one end of the band 22 is passed around the base 13 of the main member and then secured to the band proper as by stitches 24, while at the other end of this band is secured a ring or other attachment device (not shown). An end of the band 23 is passed through the slots 20 in the limbs 17,18 of the gripping element, while that element is in position with the bar 14 extending between its limbs, and then attached to the band proper as by stitches 25 so forming a loop at that end of the band. The band 23 is then passed through a ring 26 or other attachment device through which it may freely move and then through the other slots 21 in the limbs 17,18 of the gripping device to pass between the base of that device and the clamping bar 4.

With the rings or other attachment devices connected to spaced points between which tension is to be applied and maintained, the free end of the band 23 is pulled manually to draw more of that band through the slots 21 with reduction of the effective lengths of the two bands. As the pull on the free end of the band 23 increases the tension, its loop end pulls on the gripping element to move it relative to the bar 14 and by its closure to move the free ends of the limbs 17,18 towards one another. the band is thus caused to assume a tortuous path (see FIG. 4) between the edges of the slots through which it passes and the bar 14 which resists reverse movement thereof. The base ends of the limbs 17,18 also press portions of the band onto the bar 14 further to resist reverse movement and in extreme condition the base 19 may also press the band onto the adjacent face of the bar 14. The band is thus firmly held in its tensioned length adjusted condition. The bands may now be further tensioned and the clamping device locked in operative condition by rotation through some 180° of its main member relative to the bar 14 with movement of its base 13 to the opposite side of the rotational axis, i.e. into the position shown in FIG. 4, when part of the band 22 may be introduced between the ends $11^1$, $12^1$ of the limbs 11,12 of the main member to hold that member against reverse rotation.

To release tension, for example preparatory to removing the lashing, the limbs 11,12 of the main member are disengaged from the band 22 and that member reverse rotated back into original position. The free end of the band 23 is then moved to reverse move the gripping element relative to the bar 14 until the slots 21 in its limbs move clear of such bar when the band 23 may freely pass through such slots to relieve tension and increase the effective length of the bands up to maximum.

Means may be provided at the free end of the band 23 to prevent it passing through the slots 21 once assembled to the condition shown in FIG. 3.

I claim:

1. A clamp for holding first and second flexible means extending between spaced apart first and second attachment elements in adjusted effective length against strain on said flexible means tending to increase the adjusted length thereof, comprsing a gripping element of substantially U-shape with a base portion and first and second flexible limbs, each of said flexible limbs having first and second slots therein, a clamping bar located between said first and second flexible limbs, said first flexible means having at one of its ends a loop extending through said first slots in said first and second flexible limbs and after passing through said first attachment element extending through said second slots in said first and second flexible limbs between said base portion and said clamping bar, a member carrying said clamping bar, and means for connecting said member to said second flexible means.

2. A clamp as claimed in claim 1, wherein said clamping bar is formed by an edge of an aperture in said member connected to said second flexible means, and said member includes a finger grip portion.

3. A clamp as claimed in claim 1, wherein said member connected to said second flexible means comprises a U-shape member with a base portion and first and second limbs, means for journalling the ends of said clamping bar in said first and second limbs adjacent to said base portion, said second flexible means being connected to said base portion, and said first and second limbs having their free ends inturned towards one another in spaced relation.

* * * * *